United States Patent
Guillard et al.

(10) Patent No.: US 7,502,667 B2
(45) Date of Patent: Mar. 10, 2009

(54) METHOD OF OPERATING A PRODUCTION PLANT AND PRODUCTION PLANT

(75) Inventors: Alain Guillard, Paris (FR); Patrick Le Bot, Vincennes (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 707 days.

(21) Appl. No.: 10/520,998

(22) PCT Filed: Jun. 24, 2003

(86) PCT No.: PCT/FR03/01939

§ 371 (c)(1),
(2), (4) Date: Jan. 7, 2005

(87) PCT Pub. No.: WO2004/007055

PCT Pub. Date: Jan. 22, 2004

(65) Prior Publication Data

US 2005/0172666 A1 Aug. 11, 2005

(30) Foreign Application Priority Data

Jul. 9, 2002 (FR) .................. 02 08621

(51) Int. Cl.
*G10N 30/00* (2006.01)

(52) U.S. Cl. ............... 700/266; 700/268; 700/271; 700/273; 95/1

(58) Field of Classification Search ............... 95/1; 700/266, 268, 271, 273

See application file for complete search history.

(56) References Cited

U.S. PATENT DOCUMENTS

| 4,529,425 | A | * | 7/1985 | McNeil | 62/650 |
| 4,853,015 | A | * | 8/1989 | Yoshino | 62/656 |
| 5,082,482 | A | * | 1/1992 | Darredeau | 62/646 |
| 5,084,081 | A | * | 1/1992 | Rohde | 62/656 |
| 5,152,149 | A | * | 10/1992 | Mostello et al. | 62/650 |
| 5,315,521 | A | | 5/1994 | Hanson et al. | |
| 5,505,052 | A | | 4/1996 | Ekins et al. | |
| 5,643,354 | A | * | 7/1997 | Agrawal et al. | 75/490 |
| 5,882,373 | A | | 3/1999 | Guillard et al. | |
| 6,129,778 | A | * | 10/2000 | Garnier et al. | 75/548 |
| 6,576,040 | B2 | * | 6/2003 | Magnet et al. | 75/585 |

FOREIGN PATENT DOCUMENTS

| EP | 0 556 861 | 8/1993 |
| EP | 0 795 614 | 9/1997 |

OTHER PUBLICATIONS

International Search Report for PCT/FR03/01939.

\* cited by examiner

*Primary Examiner*—Sam P Siefke
(74) *Attorney, Agent, or Firm*—Elwood Haynes

(57) ABSTRACT

Production plants for treating gas mixtures and methods of their operation. The plant's treatment unit is operated in periods when the cost of electricity is either above a first level or below a second level. At some point when the cost is below the second level, part of the fluid is stored in a storage tank. This stored liquid is supplied to the customer when the cost is above the first level. When the cost is below the second level, a fluid with predefined properties is produced by the treatment unit. When the cost is above the first level, the power consumption of the treatment unit is reduced and a less ideal fluid is produced.

11 Claims, 1 Drawing Sheet

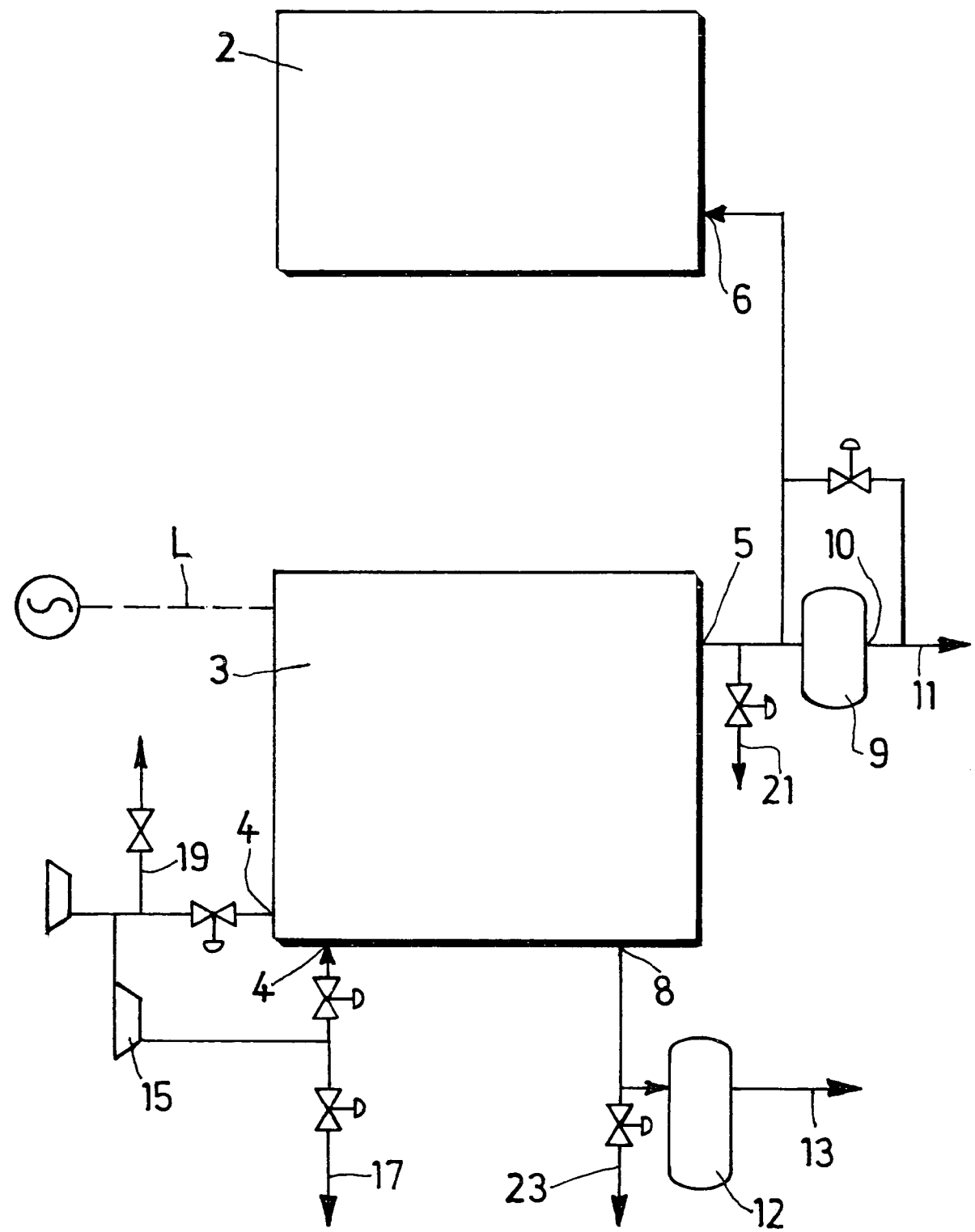

US 7,502,667 B2

METHOD OF OPERATING A PRODUCTION PLANT AND PRODUCTION PLANT

BACKGROUND

EP-A-0 795 614 discloses an air separation apparatus that sends gases or liquids into a storage tank when the power consumption of an arc furnace is low. When the furnace is operating at full power, the air separation apparatus is placed in reduced operation and the gas requirements of the furnace are supplied from the storage tank.

Energy deregulation has introduced electrical energy cost volatility. During relatively short time periods (which are known only very shortly before they occur), within the next few hours, the price of electricity may be multiplied by a factor of 10 relative to the base price, or by even more over an even shorter time.

One method of reducing energy costs of an air separation apparatus is disclosed in U.S. Pat. No. 5,315,521.

The air separation units are units that consume a very large amount of electrical energy and, in order to respond to this volatility in electrical pricing and to take advantage of it, have no other solutions than to shut down or reduce their production, but the latter solution does not allow a substantial reduction in the electrical energy consumed. Conventionally, the units may keep the products within given specifications by lowering the production down to about 65% of the nominal flow rates with energy consumption then lying between about 70% of the nominal consumption (that is to say the energy consumption for 100% production).

To meet all the requirements of their customers in terms of oxygen, nitrogen and other products obtained from air gases, which requirements generally remain constant even during such periods of energy volatility, these gases are liquefied beforehand (which represents a certain extra expenditure of energy) when electrical energy is available at a low cost, and these liquids are vaporized during these same peak periods. This liquid therefore supplements or completely covers the customers' requirements.

The problem with shutting down an air separation apparatus during these peak periods is that the time to restart it after the peak period is lengthy, around 8 to 24 hours, depending on the length of the shutdown, during which period it is always necessary to vaporize liquid produced beforehand, thereby reducing the economic benefit of this approach. Another disadvantage of this approach is the deterioration of the machines and other components, these repeated start-ups introducing fatigue that limits the lifetime of the said equipment.

"*Optimal Demand-Side Response to Electricity Spot Prices for Storage-Type Customers*" by Daryanian et al., IEEE Transactions on Power Systems, Vol. 4, No. 3, August 1989 explains that, in an air separation unit, it is worthwhile to permanently operate the compressor at full load irrespective of the customer's requirements.

SUMMARY

The present invention relates to a method of operating a production plant and also relates to a production plant. The production plant comprises a gas mixture treatment unit supplied with electricity used, for example, to operate a compressor for the gas mixture to be treated.

It is an aim of the invention is to alleviate the drawbacks of the methods and plants of the prior art.

It is an object of the invention to provide a method of operating a production plant comprising at least one unit for treating at least one gas mixture, said unit delivering at least one fluid to a consumer and being supplied with electricity, in which method:

the treatment unit is operated during periods in which the cost of electricity is above a first predefined threshold and during periods in which the cost of electricity is below a second predefined threshold, the first threshold being greater than or equal to the second threshold;

during at least one period in which the cost of electricity is below the second threshold, at least one portion of the fluid is stored, in liquid and/or gaseous form, in at least one storage tank;

during at least one period in which the cost of electricity is above the first threshold, the fluid is delivered to the consumer from at least one storage tank after a vaporization step if it is stored in liquid form; and during at least one period in which the cost of electricity is below the second threshold, at least one fluid is produced, in a line of the treatment unit, with a predefined purity, a predefined flow rate, a predefined temperature and a predefined pressure in the treatment unit;

characterized in that, during at least one period in which the cost of electricity is above the first threshold, the power consumption of the treatment unit is reduced, relative to the power consumption of the treatment unit when the cost of electricity is below the second threshold, and all or a portion of the fluid is produced in the line of the treatment unit with a purity below the predefined purity and/or a flow rate below the predefined flow rate and/or a temperature below the predefined temperature and/or a pressure below the predefined pressure and is sent elsewhere than to a consumer, possibly being at least partly vented.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates a schematic view of one embodiment of a combined gas consumption and air separation unit, according to the current invention.

DESCRIPTION OF PREFERRED EMBODIMENTS

The invention provides a method of operating a production plant comprising at least one unit for treating at least one gas mixture, said unit delivering at least one fluid to a consumer and being supplied with electricity, in which method:

the treatment unit is operated during periods in which the cost of electricity is above a first predefined threshold and during periods in which the cost of electricity is below a second predefined threshold, the first threshold being greater than or equal to the second threshold;

during at least one period in which the cost of electricity is below the second threshold, at least one portion of the fluid is stored, in liquid and/or gaseous form, in at least one storage tank;

during at least one period in which the cost of electricity is above the first threshold, the fluid is delivered to the consumer from at least one storage tank after a vaporization step if it is stored in liquid form; and during at least one period in which the cost of electricity is below the second threshold, at least one fluid is produced, in a line of the treatment unit, with a predefined purity, a predefined flow rate, a predefined temperature and a predefined pressure in the treatment unit;

characterized in that, during at least one period in which the cost of electricity is above the first threshold, the power consumption of the treatment unit is reduced, relative to the power consumption of the treatment unit when the cost of electricity is below the second threshold, and all or a portion of the fluid is produced in the line of the treatment unit with a purity below the predefined purity and/or a flow rate below the predefined flow rate and/or a temperature below the predefined temperature and/or a pressure below the predefined pressure and is sent elsewhere than to a consumer, possibly being at least partly vented.

According to other optional aspects:

during at least one period in which the cost of electricity is below the second threshold, a given stream of the compressed gas mixture is sent to the treatment unit in order to be treated therein;

during at least one period in which the cost of electricity is above the first threshold, a reduced stream of the gas mixture relative to the given stream is sent to the treatment unit in order to be treated therein, said stream possibly being separated into fluids enriched with certain components of the gas mixture;

the treatment unit is an air separation apparatus that produces at least one stream enriched with gaseous oxygen and/or at least one stream enriched with gaseous nitrogen and/or at least one stream enriched with argon and/or at least one stream enriched with liquid oxygen and/or at least one stream enriched with liquid nitrogen and/or at least one stream enriched with liquid argon as final product(s);

during a period in which the cost of electricity is above the first threshold, the total power consumption of the treatment unit is reduced by at least 25%, preferably by at least 50%, relative to the power consumption of the treatment unit operating when the cost of electricity is below the second threshold. The total consumption comprises, for an air separation apparatus, the consumption of the main air compressor, of the optional product supercharger and/or product compressor(s), pumps, water circuits, etc.;

during at least one period in which the cost of electricity is above the first threshold, at least one product of the treatment unit is produced with approximately the same purity and with either a reduced flow rate or substantially the same flow rate as that at which it is produced, during at least one period in which the cost of electricity is below the second threshold;

at least one of the products of the treatment unit that is produced with approximately the same purity as that at which it is produced during at least one period in which the cost of electricity is below the second threshold is a nitrogen-enriched stream and/or an argon-enriched stream;

the treatment unit treats at least one gas mixture throughout the periods in which the cost of electricity is above the first threshold;

a compressor compresses a gas mixture intended for or coming from the treatment unit and when the cost of electricity is above the first threshold, the compressor operates with reduced load, at least one portion of the compressed gas mixture being vented to atmosphere.

The terms "substantially the same" and "substantially constant" referring to purity cover a variation in purity of 0.5%, possibly 0.3%.

The term "substantially the same" referring to a flow rate covers a variation in flow rate of 5%, possibly 2%.

The term "substantially the same" referring to a temperature covers a variation in temperature of 5° C., possibly 2° C.

The term "substantially the same" referring to a pressure covers a variation in pressure of 5%, possibly 2%.

It is an object of another aspect of the invention to provide a production plant, comprising:

i) at least one unit for treating at least one gas mixture, delivering at least one fluid to a consumer and supplied with electricity;

ii) means for making the treatment unit operate during periods in which the cost of electricity is above a first predefined threshold and during periods in which the cost of electricity is below a second predefined threshold, the first threshold being greater than or equal to the second threshold;

iii) at least one storage tank and means for storing at least one portion of the fluid, in liquid and/or gaseous form, in at least one storage tank during at least one period in which the cost of electricity is below the second threshold;

iv) means for delivering the fluid to the consumer from at least one storage tank, after a vaporization step if it is stored in liquid form, during at least one period in which the cost of electricity is above the first threshold; and v) means for producing, via a line of the treatment unit, at least one fluid having a predefined purity, a predefined flow rate, a predefined temperature and a predefined pressure in the treatment unit during at least one period in which the cost of electricity is below the second threshold;

characterized in that it comprises means for producing the fluid via the line with a purity below the predefined purity and/or a flow rate below the predefined flow rate and/or a temperature below the predefined temperature and/or a pressure below the predefined pressure, means for operating the treatment unit in such a way that, during at least one period in which the cost of electricity is above the first threshold, the power consumption of the treatment unit is reduced relative to the power consumption of the unit during the period in which the cost of electricity is below the second threshold, and means for sending the fluid produced and/or at least one portion of the gas mixture, particularly air, other than to the consumer during this period in which the cost of electricity is above the first threshold, preferably only during this period in which the cost of electricity is above the first threshold.

According to other optional aspects, the plant may comprise:

means for modifying the operation of the plant according to the cost of electricity with which it is supplied;

a compressor for compressing a gas mixture intended for or coming from the treatment unit, means for sending the compressed gas mixture to the treatment unit and means for venting the compressed gas mixture; and means for delivering the fluid to the consumer from at least one storage tank, after a vaporization step if it is stored in liquid form, only during at least one period in which the cost of electricity is above the first threshold.

The production levels due to consumers are maintained, during high cost periods, by delivering stored gases and/or vaporizing liquefied gases that are stored in liquid form during periods in which energy costs are lower.

Although the total energy bill is thereby reduced, these approaches significantly increase the amount of energy consumed, but without the lifetime of the critical equipment suffering, and without being penalized by the time to restart a shut down unit.

If nitrogen production is high compared with oxygen production, a variant of the above approach may be to reduce to a minimum the flow rate of oxygen with a purity that is off-specification, but to keep the nitrogen produced at the minaret of the low-pressure column within the correct specification, nitrogen not having a high energy cost.

This approach also allows the unit to rapidly return from the operating mode with off-specification products to one of the nominal operating modes with in-specification products, conventionally in less than half an hour.

This FIGURE shows, by way of example with respect to an air compressor 1, a consumption unit 2, in this case an electric furnace, and a unit 3 for treating a gas mixture, in this case for treating air introduced via at least one inlet 4 and delivering, at least one outlet 5, at least one gas sent to an inlet 6 of the furnace. The treatment unit 3 is supplied with electric current delivered by the supply line L, typically by a local electricity company.

Typically, the treatment unit 3 is an air separation apparatus that delivers oxygen at its outlet 5 and pure or impure nitrogen, or argon, at an outlet 8.

According to one aspect of the invention, the outlet 5 is connected to a storage device 9 having at least one outlet 10 that can be connected to the inlet 6 of the consumption unit 2 or to a line 11 for delivery to another user station. Similarly, the outlet 8 is connected to a storage device 12 having an outlet connected to a delivery line 13.

When the price of electricity is below a second threshold, the air separation apparatus has an almost constant given power consumption and produces oxygen at the outlet 5, which is connected to a line of the treatment unit, with a flow rate, pressure, temperature and purity that are predefined and required by the furnace, for example a flow rate D, a pressure of 40 bara and a purity of 99.7 mol % and a temperature close to room temperature. One portion of this oxygen is sent directly to the consumption unit and the remainder is stored in liquid or gaseous form in the storage tank 9. This storage tank may, as is known, be at room temperature if it contains only gaseous oxygen or at a cryogenic temperature if it contains at least liquid oxygen, the storage tank possibly even being in the cold box or outside this cold box.

The separation apparatus also produces, at the outlet 8 connected to one line of the treatment unit, nitrogen with a flow rate d, a pressure of 35 bara and a purity of 1 ppm of oxygen and a temperature close to room temperature.

When the price of electricity exceeds a first threshold, greater than or equal to the second threshold, the power consumption of the air separation apparatus drops by at least 25%, preferably at least 50%, without at all stopping.

The flow rates and the purities of the products at the outlets 5, 8, which are connected to the same lines of the treatment unit, are reduced in such a way that a stream of oxygen with a flow rate of 0.8 D having a purity of 60 mol % oxygen and a stream of nitrogen with a flow rate of 0.6 d having a purity of 2 mol % oxygen are produced. These purities no longer comply with the performance requirements of the consumer and the products are therefore discharged into the atmosphere via the vents 21, 23 or are employed elsewhere.

It is also possible for the flow rate, the temperature and/or the pressure of the oxygen and/or of the nitrogen to be below the predefined values.

Alternatively, the purity of the oxygen and/or of the nitrogen may remain substantially constant, while the flow rate and/or the temperature and/or the pressure of this gas or these gases are/is lowered.

To deliver all the gases required in the consumption unit, gaseous oxygen coming from the storage tank 9 is produced, possibly by vaporizing a liquid stream within the cold box against air or nitrogen. More generally, the vaporization takes place outside the cold box by heat exchange with the ambient air or with steam.

It is possible to reduce the consumption of the separation apparatus by only degrading the oxygen production in the case in which the cost of electricity exceeds the first threshold, in such a way that the flow rate, the pressure, the temperature and the purity of the nitrogen remain substantially constant (that is to say they vary by no more than 0.5%, possibly 0.3%, in the case of the purities, by no more than 5%, possibly 2%, in the case of the flow rates, by no more than 5° C., possibly 2° C., in the case of the temperatures and by no more than 5%, possibly 2%, in the case of the pressures).

Only when the cost of electricity exceeds the first threshold does the air compressor 1 intended for the treatment unit 3 continue to operate at low speed (that is to say by compressing a reduced stream and with a reduced delivery pressure, for example by means of adjustable blades) and the compressed air produced is at least partly vented upstream of the purification unit via the vent 19. There may also be an air supercharger 15, which also continues to operate but at low speed when the cost of electricity exceeds the first threshold, venting the supercharged air via 17.

The same approach may be used with a nitrogen gas product compressor and/or an oxygen gas product compressor and/or a cycle compressor, which compressors may continue to operate at low speed when the cost of electricity exceeds the first threshold, venting the compressed gas.

Since the number of air molecules sent into the air separation apparatus is reduced, it is no longer possible to withdraw from the apparatus the fluids with the same flow rates and with the same compositions, and the operator therefore chooses between reducing the flow rate of at least one existing stream, reducing the purity of at least one existing stream, reducing the pressure of at least one existing stream, reducing the temperature of at least one existing stream or a combination of two or more of these effects.

The treatment unit 3 may be of the cryogenic type operating with a distillation column, the gases produced being advantageously in liquid form in order to make it easier to store them.

For example, the unit may produce oxygen and/or nitrogen and/or argon from air, or alternatively hydrogen and/or carbon monoxide and/or nitrogen from a mixture of these gases.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for operating a production plant, said method comprising:
   a) treating at least one gas mixture with at least one air separation unit, wherein said air separation unit is supplied with electricity;
   b) producing at least one fluid with said air separation unit;

c) operating said air separation unit during at least one first period, when the cost of electricity is greater than a first predefined value;
d) operating said air separation unit during at least one second period, wherein:
   1) said cost is less than a second predefined value; and
   2) said second value is less than or equal to said first value;
e) storing at least part of said fluid during at least part of said second period, wherein:
   1) said fluid is stored in at least one storage tank; and
   2) said fluid is stored as either a liquid or a gas;
f) delivering at least part of said fluid to a customer during at least part of said first period, wherein said fluid delivered is from said storage tank;
g) producing at least one fluid with a first set of predefined characteristics, wherein:
   1) said fluid with said first characteristics is produced by said air separation unit during at least part of said second period;
   2) said first characteristics comprise:
      i) a first purity;
      ii) a first flow rate;
      iii) a first temperature; and
      iv) a first pressure;
h) reducing the power consumption of said air separation unit to a reduced level, wherein:
   1) said power consumption is reduced during part of said first period; and
   2) said reduced level is less than the power consumption level during said second period; and
i) producing at least one fluid with a second set of predefined characteristics, wherein:
   1) said fluid with said second characteristics is produced by said air separation unit during at least part of said first period; and
   2) said second characteristics comprise at least one member selected from the group consisting of:
      i) a second purity less than said first purity;
      ii) a second flow rate less than said first flow rate;
      iii) a second temperature less than said first temperature; and
   iv) a second pressure less than said first pressure; and
   3) said fluid with said second characteristics is not delivered to said customer.

2. The method of claim 1, wherein:
a) said air separation unit produces at least one product; and
b) said product comprises at least one member selected from the group consisting of:
   1) at least one stream enriched with gaseous oxygen;
   2) at least one stream enriched with gaseous nitrogen;
   3) at least one stream enriched with gaseous argon;
   4) at least one stream enriched with liquid oxygen;
   5) at least one stream enriched with liquid nitrogen; and
   6) at least one stream enriched with liquid argon 3. The method of claim 1, wherein said reduced level is at least about 25% less than said power consumption during said second period.

4. The method of claim 3, wherein said reduced level is at least about 50% less than said power consumption during said second period.

5. The method of claim 1, further comprising producing at least one fluid with said air separation unit, wherein:
a) said fluid is produced during at least part of said first period;
b) said fluid is at least partly produced with a purity substantially the same as the purity produced during at least part of said second period; and
c) said fluid is produced with a flow rate, wherein said flow rate comprises at least one member selected from the group consisting of:
   1) a flow rate less than the flow rate produced during said second period; and
   2) a flow rate substantially the same as said flow rate produced during said second period.

6. The method of claim 5, wherein said fluid comprises at least one member selected from the group consisting of:
a) a nitrogen-enriched stream; and
b) an argon-enriched stream.

7. The method of claim 1, wherein said air separation unit treats at least one gas mixture throughout said first period.

8. The method of claim 7, further comprising compressing said gas mixture, wherein:
a) said air separation unit comprises at least one compressor;
b) said compressor operates with a reduced load during said first period; and
c) during said first period at least part of said compressed gas mixture is vented to the atmosphere.

9. The method of claim 1, wherein less fluid is produced during said first period than during said second period.

10. The method of claim 1, wherein no fluid is produced during said first period.

11. The method of claim 1, wherein said fluid sent to said storage tank is of substantially constant purity.

* * * * *